United States Patent
Huang et al.

(10) Patent No.: US 8,395,667 B2
(45) Date of Patent: Mar. 12, 2013

(54) METHOD FOR MONITORING VIDEO SIGNAL TRANSMISSION AND THE DEVICE THEREOF

(75) Inventors: Shiao-Hwa Huang, Taichung County (TW); Ming-Hui Chou, Taichung County (TW); Cheng-Wei Ko, Taichung County (TW)

(73) Assignee: Mobiletron Electronics Co., Ltd., Taichung (TW)

( * ) Notice: Subject to any disclaimer, the term of this patent is extended or adjusted under 35 U.S.C. 154(b) by 382 days.

(21) Appl. No.: 12/853,059

(22) Filed: Aug. 9, 2010

(65) Prior Publication Data

US 2012/0033088 A1    Feb. 9, 2012

(51) Int. Cl.
*H04N 17/00* (2006.01)
(52) U.S. Cl. ........ 348/194; 348/192; 348/180; 348/181; 348/473; 455/67.11
(58) Field of Classification Search .................. 348/180, 348/192, 194, 181, 193, 473, 477, 478, 479; 370/241, 242, 244; 455/115.1, 115.2, 423, 455/67.11; 375/224
See application file for complete search history.

(56) References Cited

U.S. PATENT DOCUMENTS 6,985,174 B1 * 1/2006 Thompson et al. ........... 348/180

* cited by examiner

*Primary Examiner* — Jefferey Harold
*Assistant Examiner* — Jean W Desir
(74) *Attorney, Agent, or Firm* — Browdy and Neimark, PLLC

(57) ABSTRACT

A method and device for monitoring video signal transmission includes a signal encoding and transmitting module and the signal receiving module. The signal encoding and transmitting module receives a composite video signal from a video signal source to cut off a horizontal video data series following a predetermined horizontal synchronization signal following a predetermined vertical synchronization signal and add an identification code. The signal receiving module receives the composite video signal carrying the identification code and compares the identification code to transmit the composite video signal out when the identification code is correct.

26 Claims, 4 Drawing Sheets

METHOD FOR MONITORING VIDEO SIGNAL TRANSMISSION AND THE DEVICE THEREOF

BACKGROUND OF THE INVENTION

1. Field of the Invention

The present invention relates to a method and a device for monitoring video signal transmission, and more particularly to a method and a device for monitoring video signal transmission in which composite video signals carry identification codes to monitor whether a transmission of composite video signals is correct.

2. Description of the Related Art

Conventional transmission of video signals includes wire transmission and wireless transmission. Wireless transmission, which has no wire in a video transmission system including camera, receiver and display, is beneficial for constructing the video transmission system. However, error is a major problem in the wireless transmission, such as a home security system transmitting video signals through wireless transmission that the video signals may be received by unexpected receiver.

Such error usually occurs in the conventional transmission of analog composite video signals because of a lack of identification code and communication protocol. In other words, any receiver with the same frequency may receive the signals, and multi-signal source may transmit the signals to the same receiver, too.

Nowadays digital wireless transmission is used to transmit video signals to a predetermined target. However, transmission equipment thereof is too expensive to be used in places such as home security monitoring system or car rearview camera system.

Wire transmission has no such problem; however, wires for transmitting signals will restrict the system placement due to a location limitation. An analog video transmission may transmit wrong or false signals without identification code. It usually happens in a wire security monitoring system and causes a loophole.

SUMMARY OF THE INVENTION

The primary objective of the present invention is to provide a method and a device for monitoring video signal transmission, which has a lower cost and may avoid error in receiving signals.

According to the objective of the present invention, a method of monitoring video signal transmission includes the following:

First, receive a composite video signal, which includes continuous frames with a predetermined frequency. Each frame includes a vertical synchronization signal (VSYNC) and a plurality of horizontal synchronization signals (HSYNC) following the VSYNC, and each HSYNC includes horizontal video data series following.

Next, detect the composite video signal for finding the VSYNC and the following HSYNC of a predetermined order. After that, cut the horizontal video data series and add an identification code (ID), and then send coded and uncoded frames out.

Receive and detect the frames carrying the ID. After the VSYNC and the following HSYNC of the frames being detected, examine the horizontal video data series following the HSYNC. If they match the ID, send the frame out.

The video signal wireless transmission may be applied using a signal encoding and transmitting module and a signal receiving module.

The signal encoding and transmitting module is connected to a video signal source to receive a composite video signal from the video signal source. The signal encoding and transmitting module includes a switch unit connected to the video signal source, a first microprocessor electrically connected to the switch unit and the video signal source.

The switch unit receives the composite video signal from the video signal source and sends the composite video signal out.

A first control unit detects the composite video signal from the video signal source. The first control unit controls the switch unit to cut off the HSYNC in a predetermined order following the HSYNC of the frame when it detects the HSYNC following the HSYNC of the frame and adds an ID code for sending it out via the switch unit.

The signal receiving module includes a video signal interpreting unit for receiving the composite video signal from the signal encoding and transmitting module, a second control unit electrically connected to the video signal interpreting unit to detect the received composite video signal, a signal dividing unit electrically connected to the second control unit for receiving the composite video signal from the switch unit and sending it to the second control unit, an output control unit electrically connected to the video signal interpreting unit and the second control unit for sending the composite video signal from the video signal interpreting unit out and cutting the composite video signal off with the control of the second control unit.

The second control unit has an ID, which is the same as the first control unit and is added in the HSYNC to be compared with the ID of the horizontal video data series following the HSYNC after the video signal interpreting unit detects the HSYNC. If they are the same, the second control unit will control the output control unit and send the composite video signal out.

Therefore, the present invention provides a method and a device for monitoring accuracy of a video signal transmission by adding an ID in the analog video signal. It may monitor the accuracy of transmission at a lower cost.

DETAILED DESCRIPTION OF THE INVENTION

Figure 1:
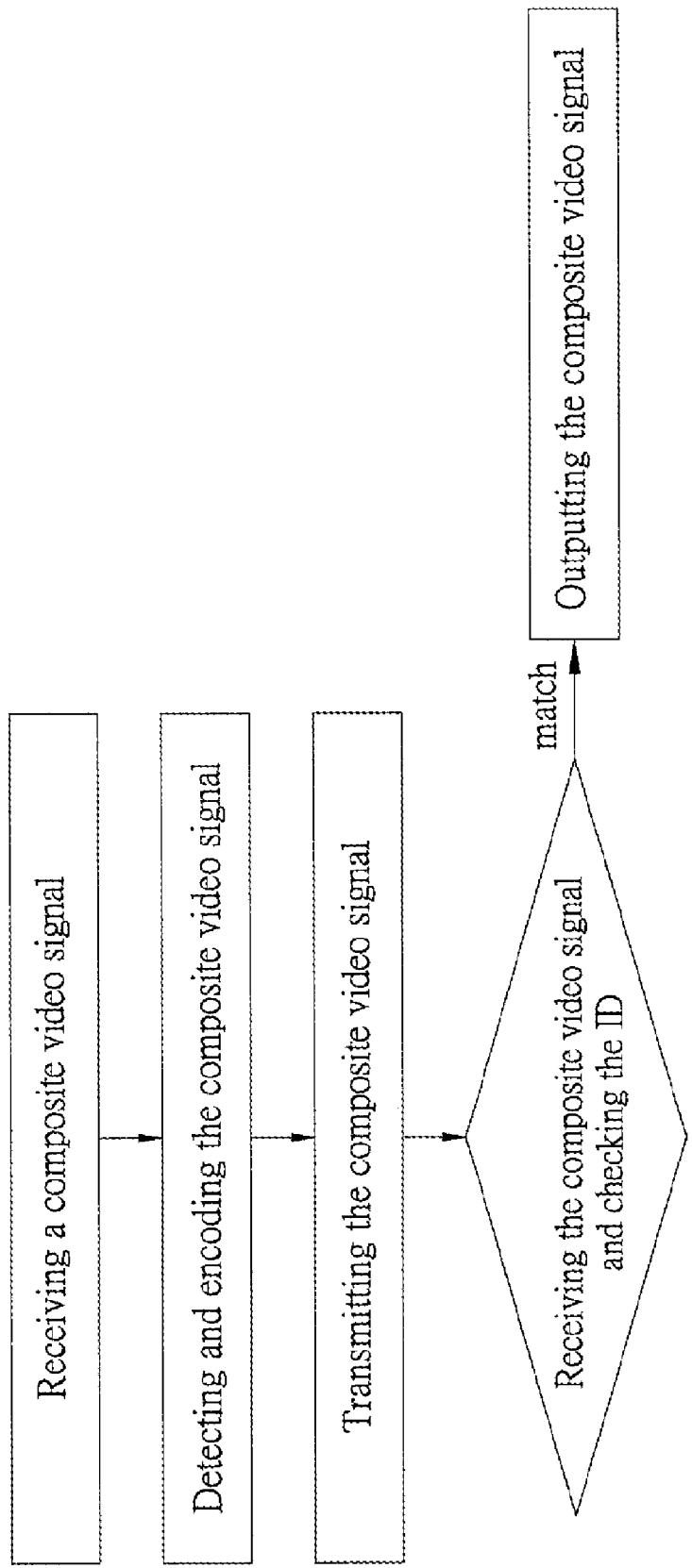
FIG. 1 is a flow chart of the method of a preferred embodiment of the present invention.

As shown in FIG. 1, a method for monitoring video signal transmission of a preferred embodiment of the present invention includes the following steps:

a). Receiving a Composite Video Signal

The composite video signal comes from a video signal source, which senses a video and transforms it into a composite video signal. The composite video signal includes a plurality of frames continuously sent out in a predetermined frequency. Each of the frames has a vertical synchronization signal (VSYNC) and a plurality of horizontal synchronization signals (HSYNC) following the VSYNC. Each HSYNC includes a horizontal video data series.

b). Detecting and Encoding the Composite Video Signal

When the VSYNC and the following HSYNC in a predetermined order are detected, it cuts off the horizontal video data series following the HSYNC and adds an identification code (ID).

In consideration of which frames to add ID, it may be added in the HSYNC of every frame, or it may be added in the HSYNC in every other frames or every second frames. A random ID may be added in the HSYNCs of the frames. In the present invention, we add the ID in the HSYNC of every frame, preferably choose the first HSYNC or the last HSYNC that it would have less effect on the composite video signal.

In consideration of which HSYNC to be cut and added ID, it may choose any one or more than one HSYNCs and then cut off the horizontal video data series following the chosen HSYNC(s) to add the ID(s). In the present invention, we choose the first HSYNCs following every VSYNC and cut off the horizontal video data series following the HSYNCs to add the IDs. Of course, it will have a better efficiency if choosing plural HSYNCs to add the IDs.

In consideration of preventing error in transmission, the present invention adds an error detecting code, such as cyclic redundancy check code (CRC), in the horizontal video data series together with the ID to detect error in transmission.

In a preferred embodiment, the ID includes an error correcting code to correct error when an error is found in transmission.

c). Transmitting the Composite Video Signal

Transmitting every frame processed or not processed under the step b through a wire transmission or a wireless transmission. In the present invention, every frame is added with the ID, which means every frame is processed under the step b.

d). Receiving the Composite Video Signal and Checking the ID

According to wire transmission or wireless transmission used in the last step, it receives the frames by a proper way and detects the frames. When the VSYNC and the following HSYNC in a predetermined order of each frame are detected, it compares the ID in the horizontal video data series following the HSYNC. It is the same as in the step b to choose the frames to detect. In the present invention, the first horizontal video data series following every HSYNC is chosen to compare the ID therein.

e) Transmitting the Composite Video Signal

The frame will be transmitted out when the comparison result is correct. The frame may be transmitted to a display to show the video or to a storage device for storage. The frame may also be transformed into other signal type for display or storage.

When the signal is transmitted through wireless transmission and the comparison result is incorrect, it means that the received signal is transmitted from other transmitter with the same frequency. It may be corrected by changing the frequency of the transmitter and the receiver and repeating the step d and the step e. At the same time, the system may provide a warning signal, such as an alarm or a flash. When the signal is transmitted through wire transmission and the comparison result is incorrect, it means that someone breaks the cable and transmits unexpected signal. In this condition, the system may provide a warning signal, such as an alarm, signals on a screen or a flash. To be more secure, the system can stop signal transmission when the system is releasing the warning signal.

Figure 2:
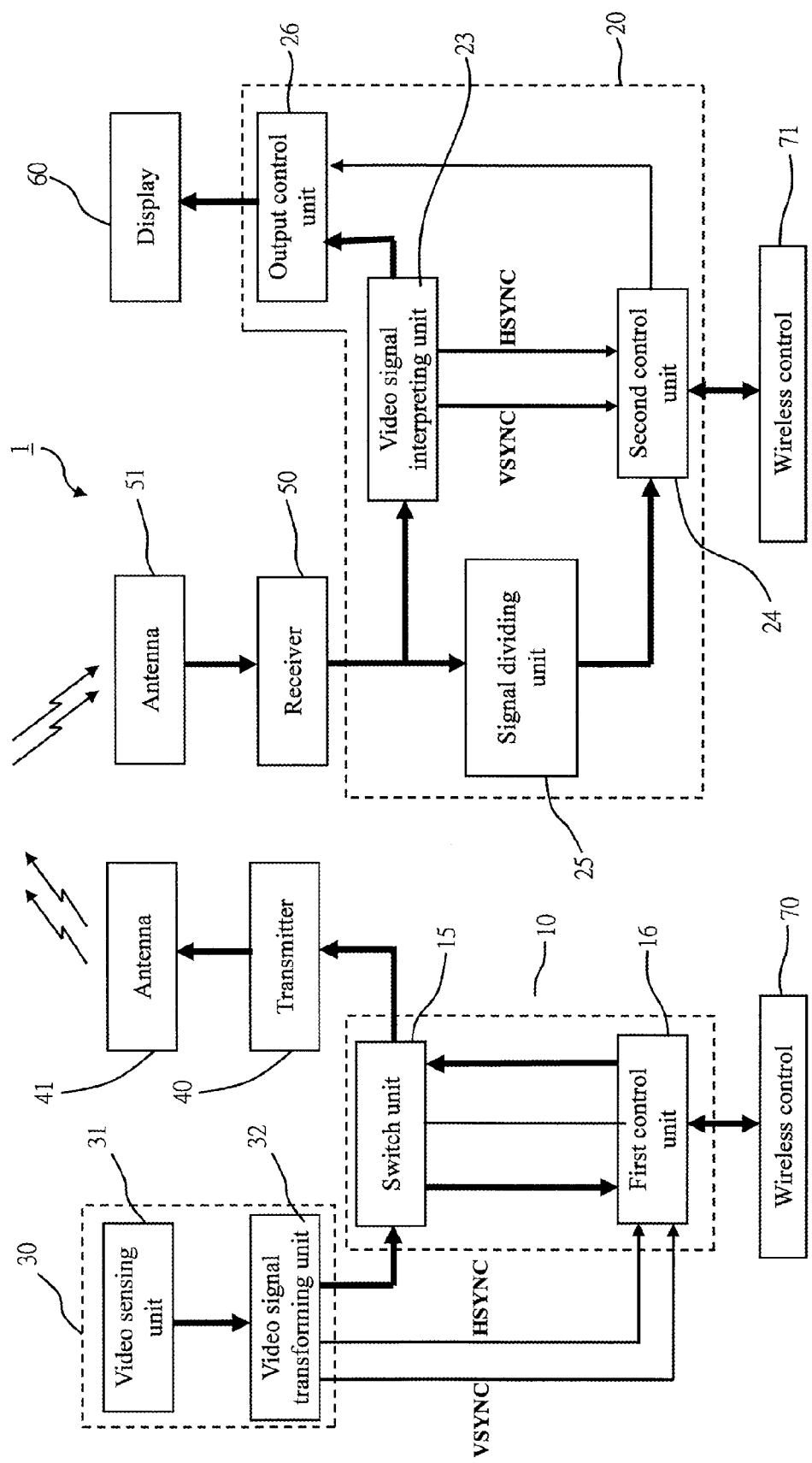
FIG. 2 is a block diagram of the device of the preferred embodiment of the present invention.

As shown in FIG. 2, a device 1 for monitoring video signal transmission as described above includes a signal encoding and transmitting module 10 and a signal receiving module 20.

The signal encoding and transmitting module 10 connects a video signal source 30 to receive composite video signals from the video signal source 30. The video signal source 30 includes a video sensing unit 31 and a video signal transforming unit 32.

The video sensing unit 31 senses a video and generates video data. The video sensing unit 31 may be a charge coupled device (CCD) or a complementary metal-oxide semiconductor (CMOS) or other equivalent devices.

The video signal transforming unit 32 may be a video encoder electrically connected to the video sensing unit 31 to receive the video data from the video sensing unit 31 and transform them into a composite video signal, such as NTSC signal or PAL signal. The composite video signal includes a plurality of frames with a predetermined frequency for transmitting out. Each frame includes the VSYNC and the HSYNCs following the VSYNC. Each HSYNC includes the horizontal video data series following thereafter.

The signal encoding and transmitting module 10 includes:

A switch unit 15 is electrically connected to the video signal transforming unit 32 of the video signal source 30 to receive the composite video signal from the video signal transforming unit 32 and transmit the composite video signal out. In the present invention, the switch unit 15 is a video switch.

A first control unit 16, which is a microcontroller (MCU) in the present invention, stores an identification code (ID) therein. The first control unit 16 is electrically connected to the video signal transforming unit 32 and the switch unit 15 to detect the composite video signal from the video signal transforming unit 32. The first control unit 16 controls the switch unit 15 to cut off the horizontal video data series following the HSYNC and add the ID code, and then sends the signal out via the switch unit 15 when the first control unit 16 detects the first horizontal video data series following the HSYNC of the VSYNC of each frame.

The first control unit 16 may be provided with an ID generator to generate ID randomly. It provides a better security for signal transmission than the ID pre-stored in the first control unit 16.

In consideration of preventing error in signal transmission, the first control unit 16 may be a microcontroller capable of generating an error detecting code, such as cyclic redundancy check code (CRC), and adding it to the horizontal video data series to detect error in transmission.

More preferably, the ID added in the horizontal video data series by the first control unit 16 may include an error correcting code to correct error when an error is detected.

The signal encoding and transmitting module 10 may transmit the coded composite video signal through wireless transmission or through wire transmission. A transmitter 40 and an antenna are provided for wireless transmission. The transmitter 40 is electrically connected to the switch unit 15 to transmit the composite video signal from the switch unit 15 through the antenna 41.

The signal receiving module 20 includes:

A video signal interpreting unit 23, which is a video decoder in the present invention, receives the composite video signal from the signal encoding and transmitting module 10. The video signal interpreting unit 23 is a cable connected to the switch unit 15 for wire transmission. In the present invention, the video signal interpreting unit 23 is electrically connected to a receiver 50 with an antenna 51 to receive the composite video signal from the signal encoding and transmitting module 10 via wireless transmission.

A second control unit 24, which is a microcontroller in the present invention, stores an ID therein. The ID stored in the second control unit 24 is the same as the ID in the signal encoding and transmitting module 10. The second control unit 24 is electrically connected to the video signal interpreting unit 23.

When the first control unit 16 is provided with the ID generator to generate ID randomly, the second control unit 24 is provided with an ID generator to generate ID randomly. The ID generators of the first and second control units 16, 24 generate the same ID at the same order.

A signal dividing unit 25, which is a buffer in the present invention, is electrically connected to the receiver 50 and the second control unit 24 respectively to receive and divide the composite video signal from the receiver 50 and then transmit it to the second control unit 24.

In the present invention, an output control unit 26 is provided to transmit the composite video signal to a display 60 to show the image. Of course, the output control unit 26 may transmit the composite video signal to a storage device, such as a hard disk, to store the composite video signal. It is easy to understand that the output control unit 26 may transform the composite video signal other signal type for display or storage.

In the present invention, wireless transmission is incorporated to transmit the composite video carrying the ID that the signal encoding and transmitting module 10 and the signal receiving module 20 are provided with a wireless control 70 and 71 respectively in charge of communication protocol between the signal encoding and transmitting module 10 and the signal receiving module 20 that the wireless controls 70 and 71 may change the transmission frequency of the signal encoding and transmitting module 10 and the signal receiving module 20 when the second control unit finds that the ID of the horizontal video data series is inconsistent. It may provide a warning device such as an alarm or a flash.

When the wire transmission is incorporated in the transmission of the composite video signal carrying the ID, it means someone breaks the line and transmits the signal when the second control unit 24 finds that the ID of the horizontal video data series is inconsistent. The system may provide a warning signal, such as an alarm, signal on a screen or a flash. Besides, the second control unit may control the output control unit to cut the composite video signal off.

Figure 3:
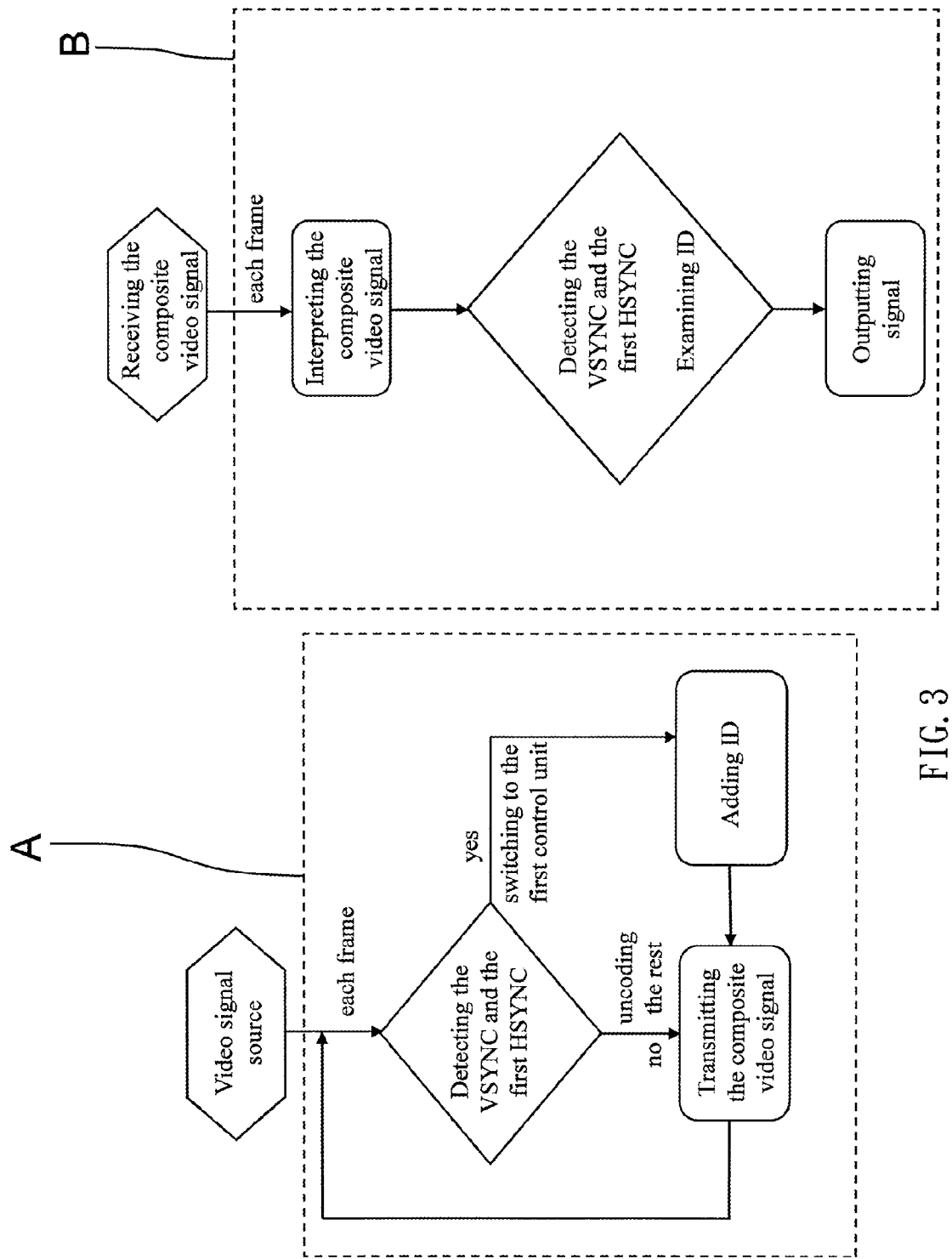
FIG. 3 is a flow chart of the operation of the preferred embodiment of the present invention.

FIG. 3 is a block diagram showing the operation of the monitoring device. The signal encoding and transmitting module 10 has the first control unit 16 detecting the VSYNC and the HSYNCs after the composite video signal is received. The first control unit 16 adds the ID into the horizontal video data series following the first HSYNC and transmits it out when it finds the VSYNC and the first HSYNC, and then transmits it out. The other HSYNCs following the VSYNC are transmitted directly.

The signal receiving module 20 receives and interprets the composite video signal from the signal encoding and transmitting module 10 and has the second control unit 24 comparing the ID in the composite video signal with the ID stored therein when the first HSYNC following the VSYNC is detected. The signal is transmitted out when the IDs are consistent.

Figure 4:
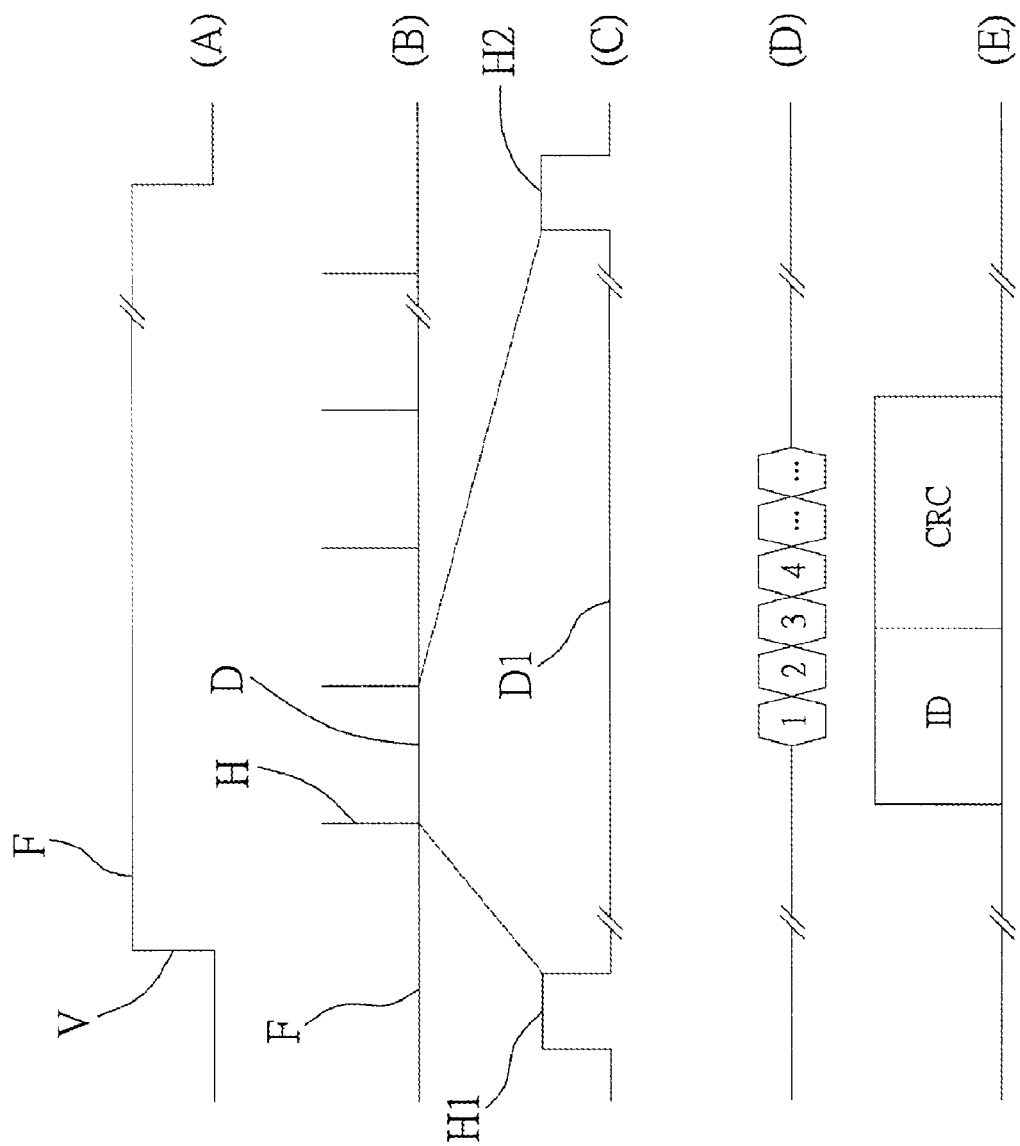
FIG. 4 is a sketch diagram, showing the composite video signal carrying the ID.

FIG. 4A to FIG. 4E shows how to add the ID in the composite video signal. FIG. 4A shows a VSYNC V and a frame F following the VSYNC V of a composite video signal. FIG. 4B shows a HSYNC H and a horizontal video data series D following the HSYNC H of the frame F. FIG. 4C shows a horizontal video data series D1 between a first HSYNC H1 and a second HSYNC H2. FIG. 4D and FIG. 4E show that the first control unit 16 cuts off the horizontal video data series D1 following the first HSYNC H1 and adds an ID when it finds the first HSYNC H1 following every VSYNC V.

In conclusion, the present invention provides a method and device for monitoring video signal transmission which provides the ID in the conventional analog composite video signal to check the correction of the received signal. It may lower the cost.

The description above is a few preferred embodiments of the present invention. These equivalences of the present invention are still in the scope of claim construction of the present invention.

What is claimed is:

1. A method for monitoring video signal transmission, comprising the steps of:
   a). receiving a composite video signal having frames with a predetermined frequency, each of which includes a vertical synchronization signal and a plurality of horizontal synchronization signals, each of which includes a horizontal video data series, following the vertical synchronization signal;
   b). detecting and encoding the composite video signal to cut off the horizontal video data series following the horizontal synchronization signal and add at least an identification code when the predetermined vertical synchronization signal and the predetermined horizontal synchronization signal in a predetermined order following the vertical synchronization signal of the predetermined frames are detected;
   c). transmitting all of the frames out;
   d). receiving the frames and detecting the predetermined frames to compare the identification code added in the horizontal video data series following the horizontal synchronization signal when the vertical synchronization signal and the predetermined horizontal synchronization signals following the vertical synchronization signal of each of the frames are detected; and
   e). transmitting the frames out when the identification code is correct.

2. The method as defined in claim 1, wherein the frames are transmitted through wireless transmission in the step c.

3. The method as defined in claim 2, further comprising the step f of changing a frequency of transmitting and receiving the composite signal through wireless transmission when the identification code is incorrect.

4. The method as defined in claim 2, further comprising the step f of providing a warning signal when the identification code is incorrect.

5. The method as defined in claim 1, wherein the horizontal video data series following the horizontal synchronization signal is cut off and added with the identification code when the predetermined vertical synchronization signal and the predetermined horizontal synchronization signal in a predetermined order following the vertical synchronization signal of each of the frames are detected in the step b.

6. The method as defined in claim 5, wherein the horizontal video data series following the horizontal synchronization signal is cut off and added with the identification code when the predetermined vertical synchronization signal and the first horizontal synchronization signal following the vertical synchronization signal of each of the frames are detected in the step b.

7. The method as defined in claim 6, wherein the frames are transmitted through wireless transmission in the step c.

8. The method as defined in claim 7, further comprising the step f of providing a warning signal when the identification code is incorrect.

9. The method as defined in claim 7, further comprising the step f of cutting off the composite video signal when the identification code is incorrect.

10. The method as defined in claim 1, wherein the frames are transmitted to a display for showing image in the step e.

11. A device for monitoring video signal transmission, which is connected to a video signal source to receive composite video signals from the video signal source, wherein each of the composite video signal includes a vertical synchronization signal and a plurality of horizontal synchronization signals, each of which includes a horizontal video data series, following the vertical synchronization signal, comprising:

a signal encoding and transmitting module, which is connected to the video signal source, including a switch unit and a first control unit;

the switch unit electrically connected to the video signal source to receive the composite video signal from the video signal source and transmit the composite video signal out;

the first control unit electrically connected to the video signal source and the switch unit to detect the composite video signal from the video signal source and cut off the horizontal video data series following the horizontal synchronization signal and add at least an identification code when the predetermined vertical synchronization signal and the predetermined horizontal synchronization signal in a predetermined order following the vertical synchronization signal of the predetermined frames are detected, and then transmit the composite video signal out via the switch unit; and a signal receiving module including a video signal interpreting unit, a second control unit, a signal dividing unit, and an output control unit;

the video signal interpreting unit receiving the composite video signal carrying the identification code from the signal encoding and transmitting module;

the second control unit electrically connected to the video signal interpreting unit to detect the composite video signal received by the video signal interpreting unit;

the signal dividing unit receiving the composite video signal from the switch unit of the signal encoding and transmitting module and electrically connected to the second control unit to transmit the composite video signal to the second control unit;

the output control unit electrically connected to the video signal interpreting unit and the second control unit to transmit the composite video signal from the video signal interpreting unit out and controlled by the second control unit to cut off the composite video signal;

wherein the second control unit of the signal receiving module has an identification code, which is the same as the identification code of the first control unit of the signal encoding and transmitting module to detect and compare the composite video signal, in which the identification code is added in the horizontal video data series following the horizontal synchronization signal, and transmit the composite video signal out when the identification code is correct.

12. The device as defined in claim 11, wherein the video signal source includes a video sensing unit to sense a video and generate video data and a video signal transforming unit electrically connected to the video sensing unit to receive the video data and transform the video data into the composite video signal, and the video signal transforming unit is electrically connected to the switch unit of the signal encoding and transmitting module to transmit the composite video signal to the switch unit.

13. The device as defined in claim 12, wherein the video signal transforming unit is a video encoder.

14. The device as defined in claim 11, further comprising a transmitter, a receiver, and two antennas electrically connected to the transmitter and the receiver respectively, wherein the transmitter is electrically connected to the switch unit of the signal encoding and transmitting module to transmit the composite video signal from the switch unit out through the antenna for a wireless transmission, the receiver, which is electrically connected to the video signal interpreting unit and the signal dividing unit of the signal receiving module respectively, receives the composite video signal from the transmitter through the antenna and transmits the composite video signal to the video signal interpreting unit and the signal dividing unit respectively.

15. The device as defined in claim 11, wherein the switch unit is a video switch.

16. The device as defined in claim 11, wherein the first control unit is a microcontroller.

17. The device as defined in claim 11, wherein the video signal interpreting unit is a video decoder.

18. The device as defined in claim 11, wherein the second control unit is a microcontroller.

19. The device as defined in claim 14, wherein the signal encoding and transmitting module and the signal receiving module each has a wireless control in charge of a communication protocol between signal encoding and transmitting module and the signal receiving module to change a frequency of transmitting and receiving the composite signal through wireless transmission when the identification code is incorrect.

20. The device as defined in claim 19, further comprising a warning device to provide a warning signal when the identification code is incorrect.

21. The device as defined in claim 11, wherein the signal encoding and transmitting module and the signal receiving module are connected through a cable to transmit the composite video signal.

22. The device as defined in claim 21, wherein the output control unit cuts off the composite video signal when the identification code is incorrect.

23. The device as defined in claim 21, further comprising a warning device to provide a warning signal when the identification code is incorrect.

24. The device as defined in claim 22, further comprising a warning device to provide a warning signal when the identification code is incorrect.

25. The device as defined in claim 11, wherein the first control unit stores at least one of the identification code, and the second control unit stores at least one of the identification code, which is the same as the identification code of the first control unit.

26. The device as defined in claim 11, wherein the first control unit and the second control unit each has an identification code generator to randomly generate identification codes, wherein both of the identification code generators generate the same identification code at random.

* * * * *